US007519038B2

(12) United States Patent  (10) Patent No.: US 7,519,038 B2
Zhao et al.  (45) Date of Patent: Apr. 14, 2009

(54) ADAPTIVE EDCA ALGORITHM USING TRAFFIC PREDICTION IN WIRELESS LOCAL AREA NETWORKS

(75) Inventors: Yun Zhao, San Mateo, CA (US); Huabing Liu, San Mateo, CA (US)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 11/387,351

(22) Filed: Mar. 22, 2006

(65) Prior Publication Data

US 2007/0206639 A1   Sep. 6, 2007

Related U.S. Application Data

(60) Provisional application No. 60/779,515, filed on Mar. 6, 2006.

(51) Int. Cl.
*H04Q 7/24* (2006.01)
(52) U.S. Cl. ........................... 370/338; 370/412
(58) Field of Classification Search ............... None
See application file for complete search history.

(56) References Cited

U.S. PATENT DOCUMENTS

| 6,272,110 | B1 | 8/2001 | Tunnicliffe et al. |
| 6,813,277 | B2 | 11/2004 | Edmon et al. |
| 2003/0223365 | A1 | 12/2003 | Kowalski |
| 2005/0036448 | A1 | 2/2005 | Leeuwen |
| 2005/0147041 | A1 | 7/2005 | Zaki et al. |
| 2006/0034199 | A1 | 2/2006 | Chu et al. |
| 2006/0034210 | A1 | 2/2006 | Chu et al. |
| 2008/0095124 | A1* | 4/2008 | Ramos et al. ............... 370/336 |

FOREIGN PATENT DOCUMENTS

WO   WO 2006/012911 A1   2/2006

OTHER PUBLICATIONS

Ksentini et al, Adaptive Transmission Opportunity with Admission Control for IEEE 802.11e Networks, ACM, 8 pages, 2005.*
Romdhani et al, AEDCF: Enhanced Service Differentiation for IEEE 802.11 Wireless Ad-Hoc Networks, INRIA, 25 pages, 2002.*
Kim et al, ATXOP: An Adaptive TXOP Based on the Data Rate to Guarantee Fairness for IEEE 802.11e Wireless LANs, IEEE, 5 pages, 2004.*

(Continued)

*Primary Examiner*—Frank Duong
(74) *Attorney, Agent, or Firm*—Mattingly, Stanger, Malur & Brundidge, PC

(57) ABSTRACT

A method comprises buffering at least one frame for a particular access class, e.g., video, in a transmission queue; performing contention-based procedures for access to a wireless medium; computing the size of the at least one frame in the transmission queue; predicting the size of at least one future frame expected to arrive in the transmission queue during transmission, e.g., using a time-domain or wavelet-domain prediction algorithm, of the at least one frame in the transmission queue on the wireless medium, possibly using a known pattern of frames, e.g., an MPEG GoP; and adjusting a MAC layer time value, e.g., TXOP, based on the size of the at least one frame in the transmission queue and the predicted size of the at least one future frame.

21 Claims, 9 Drawing Sheets

OTHER PUBLICATIONS

Liu et al, Adaptive EDCA Algorithm Using Video Prediction for Multimedia IEEE 802.11e WLAN, IEEE, 6 pages, 2006.*

New Jersey Center for Wireless Communication, Wireless Networking, pp. 1-6, http//web.archive.org/web/20040605083120/222.njcwt.org/research_networking.html Mar. 16, 2006.

Simon Haykin, "Adaptive Filter Theory", Fourth Edition Communications Research Laboratory, (§7.6 pp. 372-380), unknown date.

Huabing Liu and Guoqian Mao, "Prediction of Algorithms for Real-Time Variable-Bit-Rate Video", 5 pages, unknown date.

IEEE Standard for Telecommunications and Information Exchange between Systems-LAN/MAN Specific Requirements- Part 11: Wireless LAN Medium Access Control (MAC) and Physical Layer (PHY) Specifications, Amendment 8: Medium Access Control (MAC), Quality of Service Enhancements, 802.11e, Nov. 11, 2005, 211 pages.

Didier Le Gall, "MPEG: A Video Compression Standard For Multimedia Applications", Digital, Multimedia Systems, Communications Of The ACM, vol. 34, No. 4, Apr. 1991, 15 pages.

E. K. Kim and Y-J Suh, "ATXOP: An Adaptive TXOP Based On The Data Rate To Guarantee Fairness For IEEE 802.11e Wireless LANs," in Vehicular Technology Conference, 2004. VTC2004-Fall. 2004 IEEE 60th, vol. 4, pp. 2678-2681, 2004.

A. Ksentini, A. Gueroui and M. Naimi, "Adaptive Transmission Opportunity With Admission Control For IEEE 802.11e Networks," in Proceedings of the 8th ACM International Symposium On Modeling, Analysis and Simulation of wireless and mobile systems, Montreal, Quebec, Canada, 2005, pp. 234-241.

* cited by examiner

MPEG Group of Picture Coding Structure

ADAPTIVE EDCA ALGORITHM USING TRAFFIC PREDICTION IN WIRELESS LOCAL AREA NETWORKS

PRIORITY CLAIM

This application claims priority to and incorporates by reference U.S. provisional application Ser. No. 60/779,515, entitled "Adaptive EDCA Algorithm Using Video Prediction in WLAN," filed on Mar. 6, 2006, by Zhao and Liu.

TECHNICAL FIELD

This invention relates generally to wireless networks, and more particularly provides an adaptive EDCA algorithm using traffic prediction in a wireless local area network.

BACKGROUND

As users experience the convenience of wireless connectivity, they are demanding increasing support. Typical applications over wireless networks address include video streaming, video conferencing, distance learning, etc. Because wireless bandwidth availability is restricted, quality of service (QoS) management is increasingly important in 802.11 networks. IEEE 802.11e proposes to define QoS mechanisms for wireless gear that gives support to bandwidth-sensitive applications such as voice and video.

The original 802.11 media access control (MAC) protocol was designed with two modes of communication for wireless stations. The first mode, Distributed Coordination Function (DCF), is based on Carrier Sense Multiple Access with Collision Avoidance (CSMA/CA), sometimes referred to as "listen before talk." A station waits for a quiet period on the network and then begins to transmit data and detect collisions. The second mode, Point Coordination Function (PCF), supports time-sensitive traffic flows. Wireless access points periodically send beacon frames to communicate network identification and management parameters specific to the wireless network. Between sending beacon frames, PCF splits the time into a contention-free period and a contention period. A station using PCF transmits data during contention-free periods.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distribution Coordination Access (EDCA) introduces the concept of traffic categories. Using EDCA, stations try to send data after detecting that the medium is idle for a set time period defined by the corresponding traffic category. A higher-priority traffic category will have a shorter wait time than a lower-priority traffic category. While no guarantees of service are provided, EDCA establishes a probabilistic priority mechanism to allocate bandwidth based on traffic categories.

The IEEE 802.11e EDCA standard provides QoS differentiation by grouping traffic into four access classes (ACs), i.e. voice, video, best effort and background. Each frame from the upper layers bears a priority value (0-7), which is passed down to the MAC layer. Based on the priority value, the frames are mapped into the four ACs at the MAC layer. The voice AC has the highest priority; the video AC has the second highest priority; the best effort AC has the third highest priority; and the background AC has the lowest priority. Each AC has its own transmission queue and its own set of medium access parameters. Traffic prioritization uses the medium access parameters—AIFS interval, contention window (CW), and transfer opportunity (TXOP)—to ensure that a higher priority AC has relatively more medium access opportunity than a lower priority AC.

Generally, the arbitration interframe space (AIFS) is the time interval that a station must sense the medium to be idle before invoking a backoff or transmission. A higher priority AC uses a smaller AIFS interval. The contention window (CW, CWmin and CWmax) indicates the number of backoff time slots until the station can access the medium. CW starts from CWmin and doubles every time a transmission fails until it reaches its maximum value CWmax. Then, CW holds its maximum value until the transmission exceeds its retry limit. A higher priority AC uses smaller CWmin and CWmax. The Transmission Opportunity (TXOP) indicates the maximum duration that an AC can be allowed to transmit frames after acquiring access to the medium. To save contention overhead, multiple frames can be transmitted within one acquired TXOP without any additional contention, as long as the total transmission time does not exceed the TXOP duration.

To reduce the probability of two stations colliding, because the two stations cannot hear each other, the standard defines a virtual carrier sense mechanism. Before a station initiates a transaction, the station first transmits a short control packet called RTS (Request To Send), which includes the source address, the destination address and the duration of the upcoming transaction (i.e. the data packet and the respective ACK). Then, the destination station responds (if the medium is free) with a response control packet called CTS (Clear to Send), which includes the same duration information. All stations receiving either the RTS and/or the CTS set a virtual carrier sense indicator, i.e., the network allocation vector (NAV), for the given duration, and use the NAV together with the physical carrier sense when sensing the medium. This mechanism reduces the probability of a collision in the receiver area by a station that is "hidden" from the transmitter station to the short duration of the RTS transmission, because the station hears the CTS and "reserves" the medium as busy until the end of the transaction. The duration information in the RTS also protects the transmitter area from collisions during the ACK from stations that are out of range of the acknowledging station. Due to the fact that the RTS and CTS are short frames, the mechanism reduces the overhead of collisions, since these frames are recognized more quickly than if the whole data packet was to be transmitted (assuming the data packet is bigger than RTS). The standard allows for short data packets, i.e., those shorter than an RTS Threshold, to be transmitted without the RTS/CTS transaction.

With these medium access parameters, EDCA works in the following manner: Before a transmitting station can initiate any transmission, the transmitting station must first sense the channel idle (physically and virtually) for at least an AIFS time interval. If the channel is idle after the AIFS interval, the transmitting station invokes a backoff procedure using a backoff counter to count down a random number of backoff time slots. The transmitting station decrements the backoff counter by one as long as the channel is sensed to be idle. Once the backoff counter reaches zero, the transmitting station initiates an RTS transmission and awaits a CTS transmission from the receiving station. If the transmitting station receives a CTS transmission from the receiving station, the transmitting station initiates the transaction. The station can initiate multiple frame transmissions without additional contention as long as the total transmission time does not exceed the TXOP duration.

If the transmitting station senses the channel to be busy at any time during the backoff procedure, the transmitting station suspends its current backoff procedure and freezes its backoff counter until the channel is sensed to be idle for an AIFS interval again. Then, if the channel is still idle, the transmitting station resumes decrementing its remaining backoff counter. After each unsuccessful transmission, CW doubles until CWmax. After a successful transmission, CW to CWmin. The level of QoS control for each AC is determined by the combination of the medium access parameters and the number of competing stations in the network.

The default EDCA parameter values used by non-AP QoS stations (QSTAs) are identified in the table below. A TXOP_Limit value of 0 indicates that a single MAC service data unit (MSDU) or MAC protocol data unit (MPDU), in addition to a possible RTS/CTS exchange or CTS to itself, may be transmitted at any rate for each TXOP.

TABLE

Default EDCA Parameter Set

| AC | $CW_{min}$ | $CW_{max}$ | AIFSN | TXOP_Limit (ms) for 802.11 g PHY |
|---|---|---|---|---|
| AC_BK | 31 | 1023 | 7 | 0 |
| AC_BE | 31 | 1023 | 3 | 0 |
| AC_VI | 15 | 31 | 2 | 3.008 |
| AC_VO | 7 | 15 | 2 | 1.504 |

Although 802.11e enhances the original 802.11 media access control, there are still a number of remaining challenges that need to be addressed to provide comprehensive QoS support. For example, as stated above, multiple frames can be transmitted using one acquired EDCA TXOP without additional contentions as long as the total transmission time does not exceed the EDCA TXOP duration. FIG. 1 illustrates an example prior art timing diagram 100 illustrating multiple transactions during a single TXOP duration (commonly referred to as EDCA Contention Free Burst (CFB) in the 802.11e standard). As shown in this example, during the static TXOP duration 125, a sender 110 is capable of sending three frames, namely, frames 105a-105c, to a receiver 115 (including receiver acknowledgements, namely, ACKs 120a-120c). The TXOP duration is static regardless of the video traffic characteristics. While this may be efficient for constant bit rate (CBR) traffic (which presents constant frame size and inter-arrival time), it may not be efficient for variable bit rate (VBR) traffic. For example, many real-time video applications such as video conferencing and video streaming present VBR traffic with time-varying frame size and inter-arrival time. Without sufficient EDCA TXOP duration, low throughput, high delay and large packet loss due to sender buffer overflow may be experienced. While an arbitrarily large EDCA TXOP duration may help to transmit more video frames, it will likely degrade network capacity due to less admitted stations.

A system and method for increasing QoS support in wireless LANs, especially for VBR transmissions, are needed.

SUMMARY

In one embodiment, to address the problem of static TXOP duration for time-varying VBR transmissions, an adaptive EDCA algorithm dynamically tunes the EDCA TXOP duration based on the current transmission queue length and at least one predicted incoming frame size for an access category (AC), e.g., the video access category. The adaptive EDCA algorithm improves the QoS of transmission in terms of throughput, delay and bit error rate in a network of limited bandwidth without degrading network capacity (e.g., the number of stations that can be admitted to a network).

In another embodiment, the present invention provides a method comprising buffering at least one frame for a particular access class in a transmission queue; performing contention-based procedures for access to a wireless medium; computing the size of the at least one frame in the transmission queue; predicting the size of at least one future frame expected to arrive in the transmission queue during transmission of the at least one frame in the transmission queue on the wireless medium; and adjusting a MAC layer time value based on the size of the at least one frame in the transmission queue and the predicted size of the at least one future frame.

The access class may include the video access class. The step of predicting the size of the at least one future frame may include using a known pattern of incoming frames and estimating the size of the at least one future frame based on the pattern. The step of predicting the size of the at least one future frame may include using a time-domain prediction algorithm. The step of predicting the size of the at least one future frame may include using a wavelet-domain prediction algorithm. The step of predicting the size of the at least one future frame may include predicting the size of frames based on frame type. The frame types may include MPEG frame types. The MAC layer time value may include TXOP. The method may further comprise summing the size of the at least one frame in the transmission queue and the size of the at least one future frame to generate a total, and translating the total into an estimated transmission time. The method may also include accounting for transmission overhead time.

In yet another embodiment, the present invention provides a system comprising a transmission queue for buffering at least one frame for a particular access class; a contention module for performing contention-based procedures for access to a wireless medium; a queue length module for computing the size of the at least one frame in the transmission queue; a future frame size prediction module for predicting the size of at least one future frame expected to arrive in the transmission queue during transmission of the at least one frame in the transmission queue on the wireless medium; and an adjustment module for adjusting a MAC layer duration value based on the size of the at least one frame in the transmission queue and the predicted size of the at least one future frame.

The access class may include video access class. The future frame size prediction module may use a known pattern of incoming frames and estimates the size of the at least one future frame based on the pattern. The future frame size prediction module may use a time-domain prediction algorithm. The future frame size prediction module may use a wavelet-domain prediction algorithm. The future frame size prediction module may predict the size of frames based on frame type. The frame types may include MPEG frame types. The MAC layer time value may include TXOP. The system may further comprise a summation module for summing the size of the at least one frame in the transmission queue and the size of the at least one future frame to generate a total, and an estimation module for translating the total into an estimated transmission time. The estimation module may account for transmission overhead time.

In yet another embodiment, the present invention provides a system comprising means for buffering at least one frame for a particular access class in a transmission queue; means for performing contention-based procedures for access to a wireless medium; means for computing the size of the at least one frame in the transmission queue; means for predicting the size of at least one future frame expected to arrive in the transmission queue during transmission of the at least one frame in the transmission queue on the wireless medium; and means for adjusting a MAC layer time value based on the size of the at least one frame in the transmission queue and the predicted size of the at least one future frame.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

To address the problem of static TXOP duration for time-varying VBR transmissions, in one embodiment, an adaptive EDCA algorithm dynamically tunes the EDCA TXOP duration based on the current transmission queue length and at least one predicted incoming frame size for an access category (AC), e.g., the video access category. The adaptive EDCA algorithm improves the QoS of transmission in terms of throughput, delay and bit error rate in a network of limited bandwidth without degrading network capacity (e.g., the number of stations that can be admitted to a network).

Figure 1:
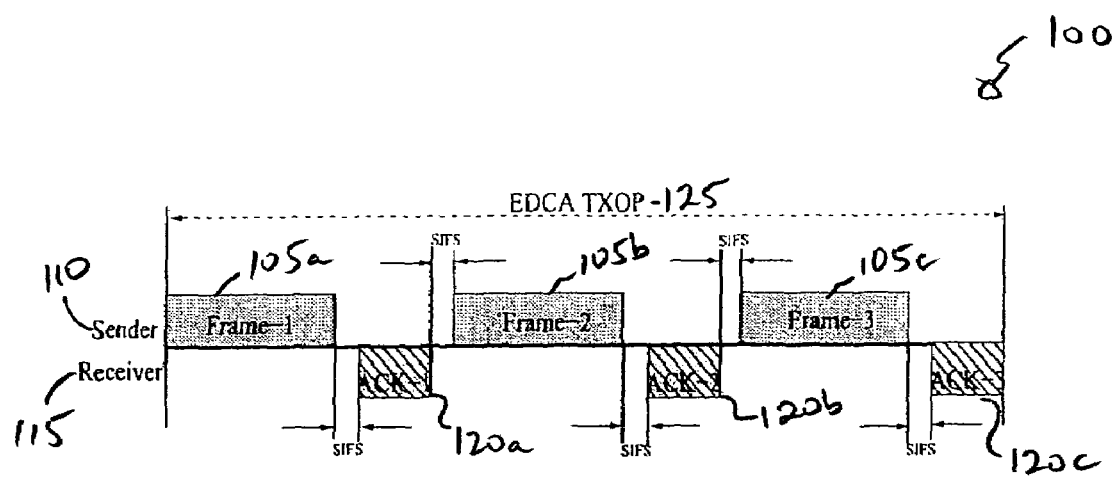
FIG. 1 illustrates a timing diagram of multiple frame transmission transactions during a default EDCA TXOP window.
Figure 2A:
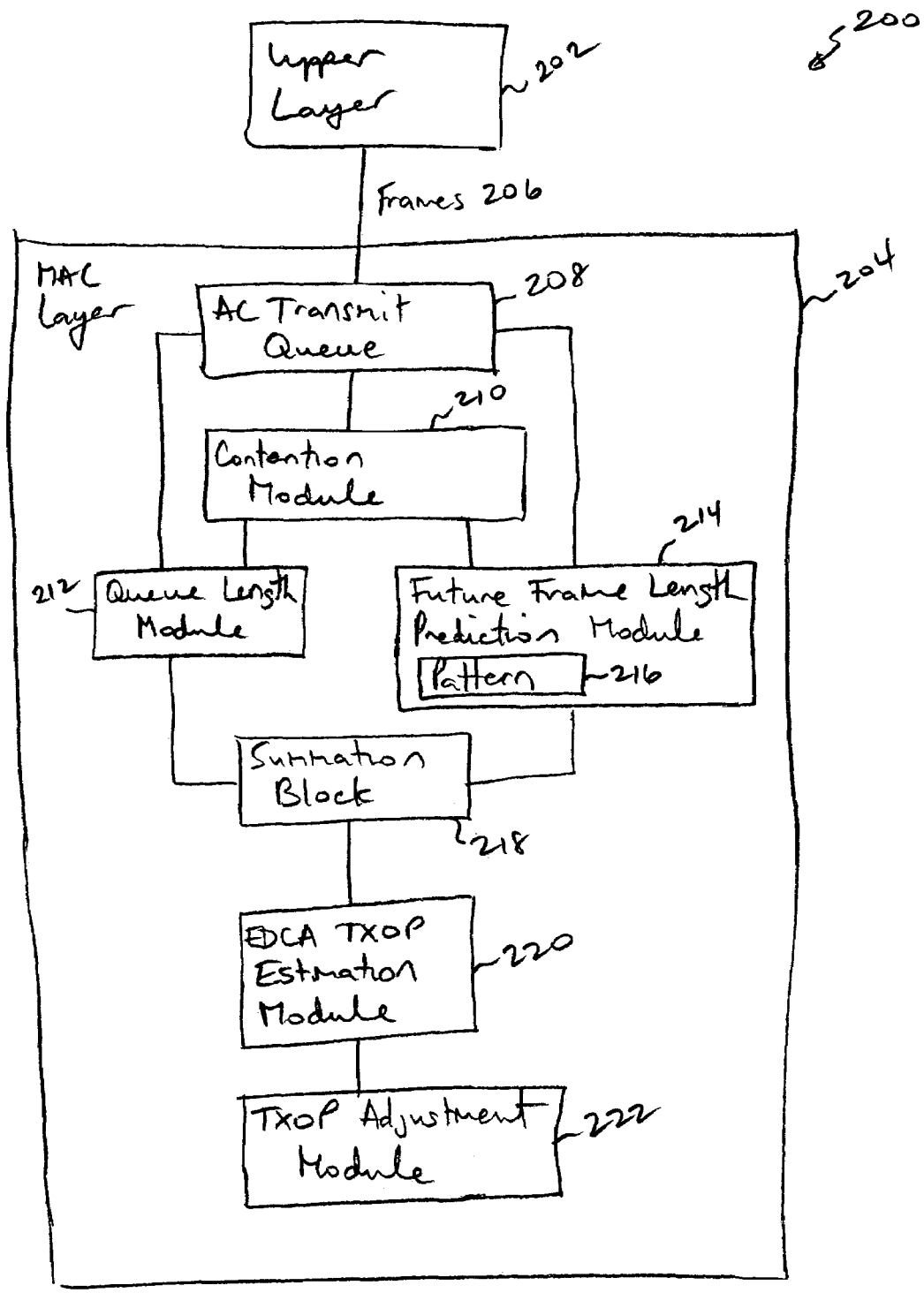
FIG. 2A is a block diagram illustrating a MAC layer architecture implementing an adaptive ECDA mechanism for an access class, in accordance with an embodiment of the present invention.

FIG. 2A illustrates a MAC layer architecture 200 for a single AC with an adaptive TXOP mechanism, in accordance with an embodiment of the present invention. Architecture 200 includes an upper layer 202 and a MAC layer 204 for a single AC, e.g., the video AC. The upper layer 202 generates frames of all types, e.g., data frames, audio frames, video frames, etc. The upper layer 202 prioritizes the frames into eight priority levels and forwards the frames for of a particular AC, e.g., frames 206, to the MAC layer 204 for that AC.

Alternatively, the frames can be divided based on priority level within the MAC layer 204. The frames 206 may include video frames, which may comprise I, P and B frames. The MAC layer 204 may be dedicated to the video AC.

The MAC layer 204 for the particular AC includes an AC transmit queue 208, which receives and buffers the frames 206 from the upper layer 202, e.g., in a FIFO buffer. The MAC layer 204 also includes a contention module 210 coupled to the transmit queue 208. Upon receiving at least one frame 206 in the transmit queue 208, the contention module 210 begins EDCA contention procedures, e.g., involving AIFS, CW, etc., to gain access to the wireless medium. Upon gaining access to the medium, the contention module 210 will begin transfer procedures, e.g., involving TXOP, NAV, RTS/CTS, etc.

Figure 6:
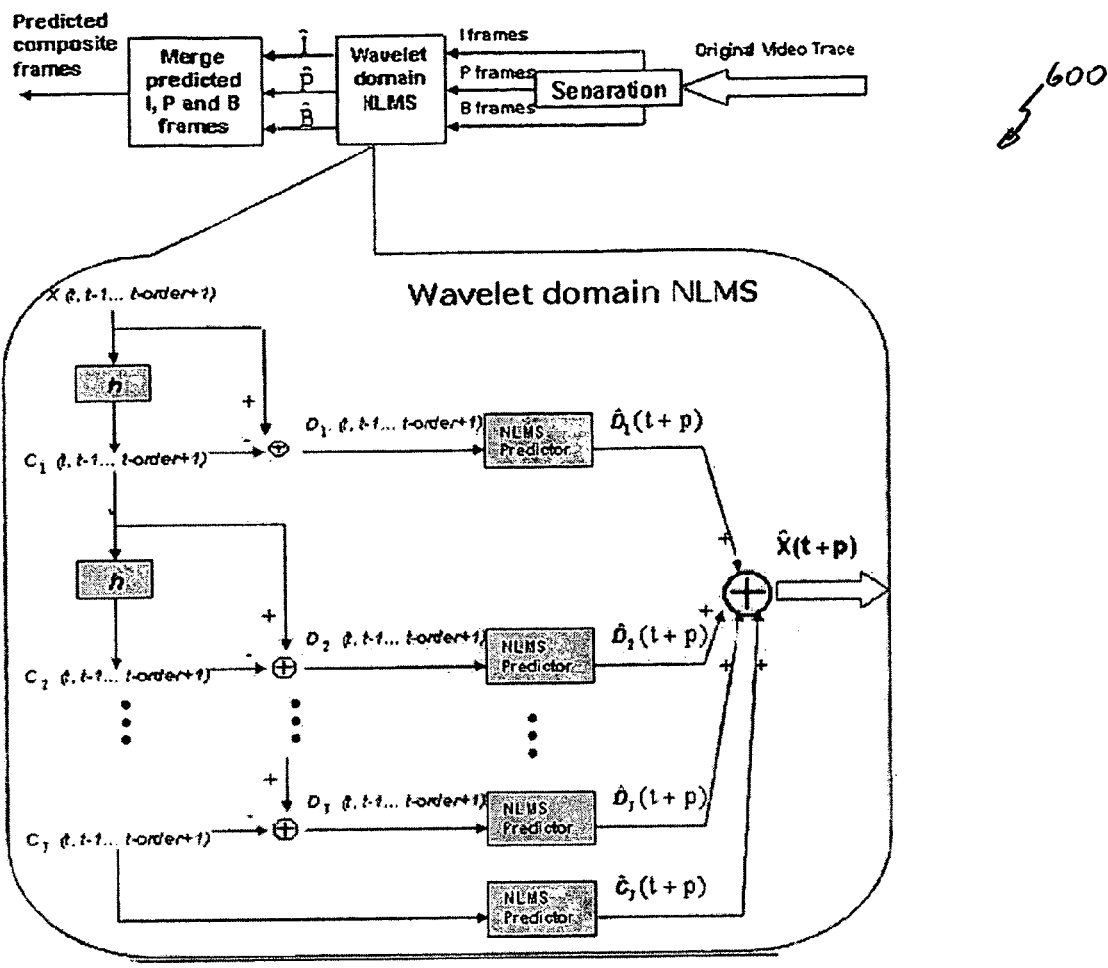
FIG. 6 illustrates an example architecture of the wavelet domain NLMS predictor, in accordance with an embodiment of the present invention.

The MAC layer 204 also includes a queue length module 212 and a future frame length prediction module 214. The queue length module 212 monitors the transmit queue 208 to determine the size of the frames 206 ready for transfer over the wireless medium. For example, if three frames 206 are pending in the transmit queue 208, the queue length module 212 will sum their sizes. The frame length prediction module 214 predicts the size of at least the next frame 206 expected to arrive into the transmit queue 208, possibly during the transmit session. The frame length prediction module 214 knows the pattern 216 of incoming frames 206, e.g., a static MPEG GoP pattern. By monitoring the sizes of the frames 206 arriving at the transmit queue 208 of each type, e.g., I frames, P frames and B frames (described below), respectively. The future frame length prediction module 214 can use historical sizes of past and current frames 206 to predict the size of the next incoming frame 206. For example, if a current video scene is more complex, then the past and current I frames 206 in the transmit queue 208 may be larger, suggesting that the next coming I frame will also be large. In one example, the predicted size of an incoming I frame 206 may be averaged from previous I frames. In another example, the predicted size of the incoming frame 206 may be based on time-domain or wavelet-domain NLMS algorithms. Time-domain and wavelet-domain algorithms are described below. FIG. 6 illustrates an example wavelet domain NLMS algorithm.

The MAC layer 204 further includes a summation block 218 that sums the queue length of the transmit queue 208 as determined by the queue length module 212 and the predicted incoming frame 206 length as determined by the future frame length prediction module 214. An EDCA TXOP estimation module 220 translates the frame size total of the transmit queue length and the predicted incoming frame 206 length into a transmit duration that includes all overhead (e.g, RTS/CTS and all ACKS) to generate an adaptive TXOP (ATXOP) duration value. The translation may include using estimated transmission speeds of the wireless medium. A TXOP adjustment module 222 adjusts the TXOP value in the MAC layer 204.

The queue length determination, future frame length prediction, TXOP estimation, and/or TXOP adjustment may operate continuously, may initiate upon request by the contention module 210, may initiate after recognizing transmission of RTS by the contention module 210, etc.

Figure 2B:
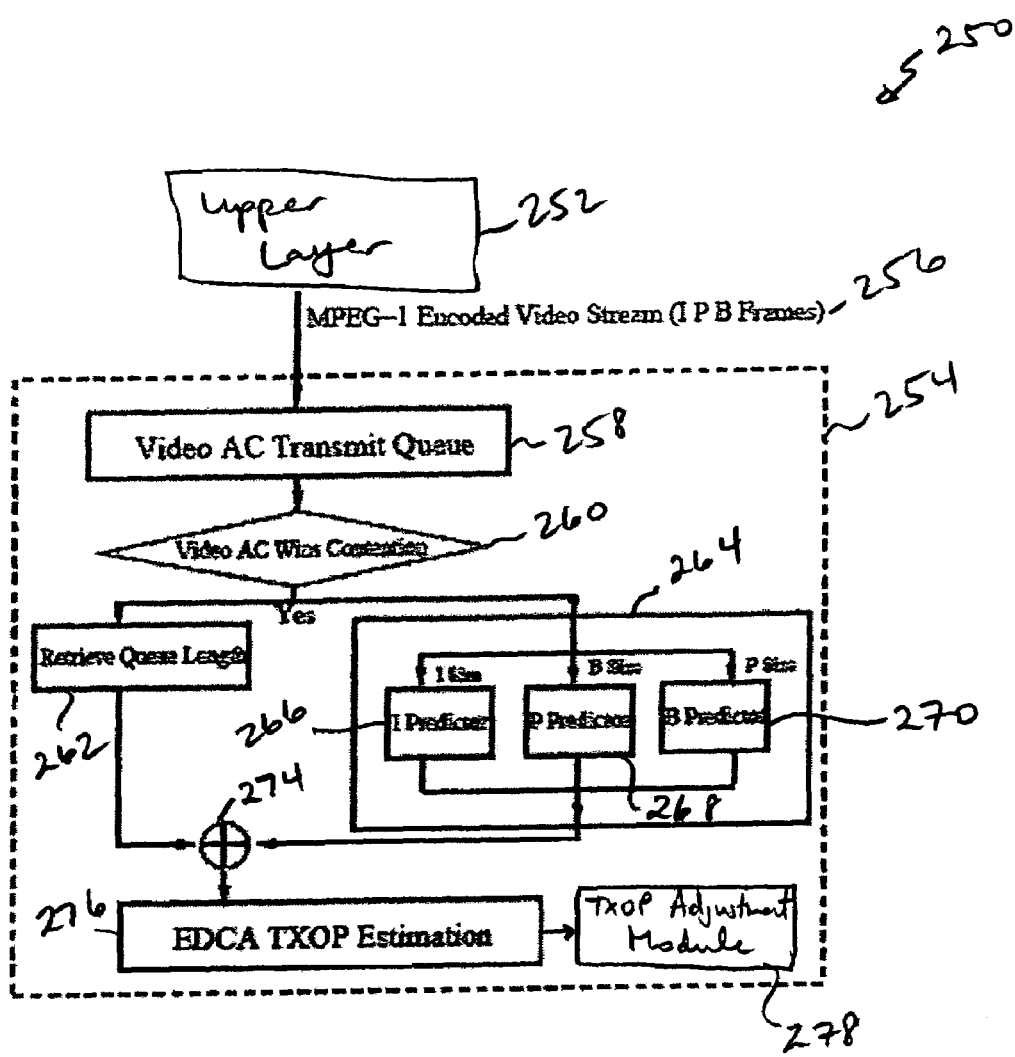
FIG. 2B is a block diagram illustrating a MAC layer architecture implementing an adaptive ECDA mechanism for a video access class, in accordance with an MPEG embodiment of the present invention.
Figure 3:
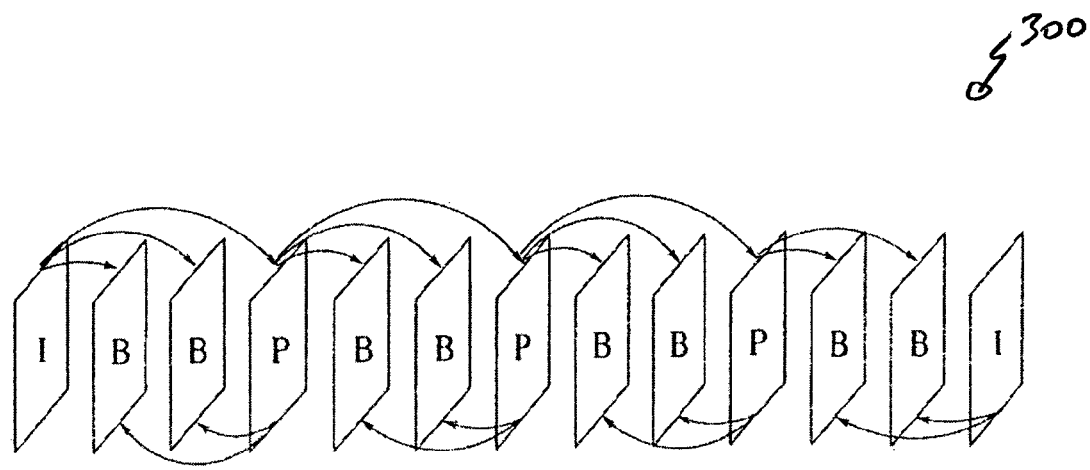
FIG. 3 illustrates an example sequence of I, P and B frames.

FIG. 2B illustrates a MAC layer video AC architecture 250, in accordance with an MPEG-1 embodiment of the present invention. Before discussing the architecture of FIG. 2B, a brief review of MPEG-1 is helpful. An MPEG encoder that compresses a video signal at a constant picture (frame) rate produces a coded stream with variable bit rate. Three types of frames are generated during compression, namely, I-frame (Intra-frame), P-frame (Predictive-frame) and B-frame (Bi-directional-Predictive-frame), each with different encoding methods. I-frames have more bits than P-frames, which have more bits than B-frames. After encoding, the frames are arranged in a deterministic periodic sequence called a Group of Pictures (GOP), e.g. I B B P B B P B B P B B. FIG. 3 illustrates an example pattern 300 of a GOP with a length of 12 is I B B P B B P B B P B B I (the second I-frame being the start of the second GOP).

Figure 4:
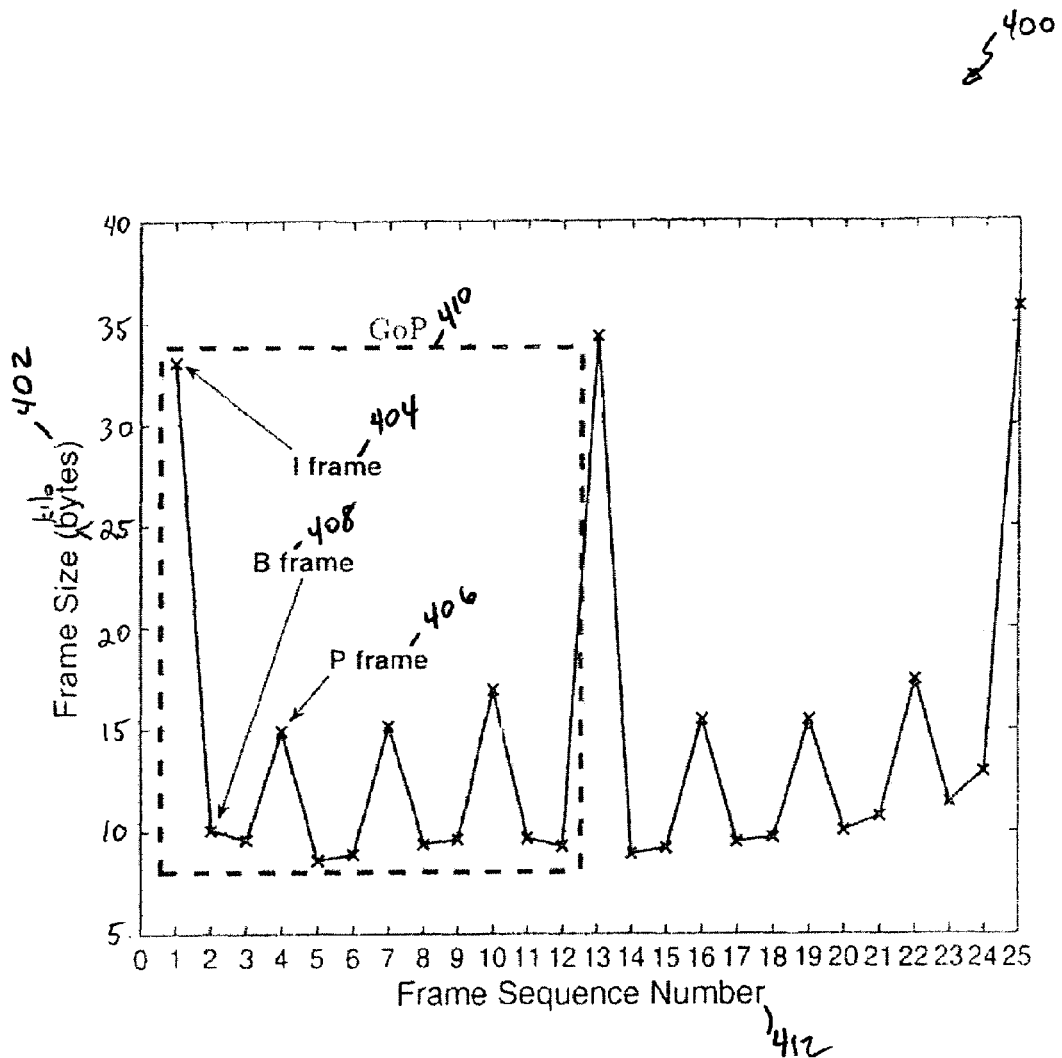
FIG. 4 is a graph illustrating example frame sizes for the sequence of I, P and B frames of FIG. 3.

As a result of different compression rates of I, P and B frames, the MPEG video stream becomes a highly fluctuating time series. FIG. 4 is a graph 400 representing example frame sizes 402 for the example repeating sequence (by frame number 412) of frames illustrated in FIG. 3. In this example, I-frames 404 are shown to have a varying frame size of between 33 kilobytes and 36 kilobytes. P-frames 406 are shown to have a varying frame size of between 15 kilobytes and 18 kilobytes. B-frames 408 are shown to have a varying frame size of between 8 and 13 kilobytes. Frames 1-12 make up a first group of pictures (GOP) 410 before the frame pattern repeats.

MAC layer video access class architecture 252 includes a video access class transmit queue 258, which receives MPEG-1 encoded video stream frames (e.g., I, P and B frames) 256 from an upper layer 252. A video access class contention module 260 performs EDCA contention procedures, e.g., including AIFS and CW.

In this embodiment, when the video access class contention module 260 wins a contention, the contention module 260 launches duration computation/prediction modules. In this embodiment, the duration computation/prediction modules include a queue length module 262 and a frame size prediction module 264. The queue length processor 262 determines the transmission queue length of frames pending in the transmission queue 258. The frame size prediction module 264 predicts the size of the next incoming frame from the upper layers 252. The frame size prediction module 264 includes three frame size prediction modules dedicated to the three specific frame types, namely, an I frame prediction module 266, a P frame prediction module 268, and a B frame prediction module 270. The I frame prediction module 266 receives I frame size information of past and current I frames 256 in the transmission queue 258 and generates a predicted I frame size for the next incoming I frame. The P frame prediction module 268 receives P frame size information of past and current P frames 256 in the transmission queue 258 and generates a predicted P frame size for the next incoming P frame. The B frame prediction module 270 receives B frame size information of past and current B frames 256 in the transmission queue 258 and generates a predicted B frame size for a future B frame. In this embodiment, the frame size prediction module 264 separates I-frame, P-frame and B-frame predictions since the different frame types have different statistical characteristics. To get better prediction results, differential prediction is utilized to compensate for variation noise. The frame size prediction module 264 uses a known pattern of video frames, e.g., a static MPEG GoP pattern, to estimate the next video frame size. Since the GOP of MPEG-1 has a deterministic pattern of I, P, B frames, the pattern of frames can be exploited to predict the next video frame type and size.

A summation module 274 sums the lengths of the frames 256 in the transmission queue 258 as determined by the queue length module 262 and the length of the predicted next incoming frame 256 as determined by the frame size prediction module 264. An EDCA TXOP estimation module 276 receives the summation information from the summation module 274 to generate an adaptive TXOP (ATXOP) duration value. The TXOP estimation module 276 incorporates all overhead, including RTS, CTS, ACKs, etc. to generate the ATXOP duration value. A TXOP adjustment module 278 receives the ATXOP duration value from the EDCA TXOP estimation module 276 and adjusts the TXOP in the MAC layer video AC architecture 254.

The frame size prediction module 264 can use averaging techniques or time-domain or wavelet-domain methodology. An example LMS prediction algorithm and an example wavelet domain prediction algorithm are described below. An example wavelet domain prediction algorithm is illustrated and described with reference to FIG. 6.

Figure 5:
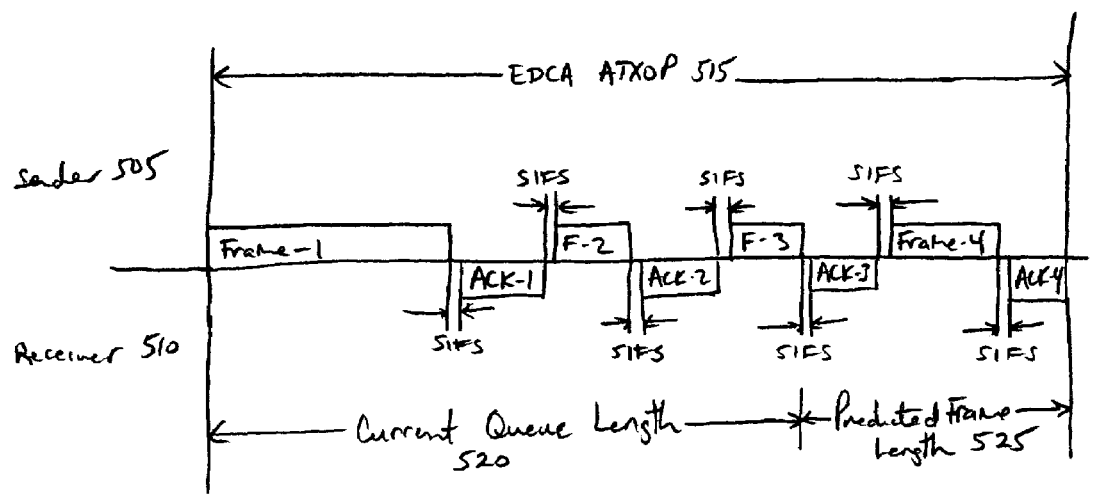
FIG. 5 illustrates a timing diagram of multiple frame transmission transactions during an adaptive EDCA TXOP window, in accordance with an embodiment of the present invention.

FIG. 5 illustrates a timing diagram 500 of multiple frame transmission transactions during an adaptive EDCA TXOP duration, in accordance with an embodiment of the present invention. Timing diagram 500 illustrates sender 505 events and receiver 510 events for four frame transactions, namely, Frame-1, Frame-2 ("F-2"), Frame-3 ("F-3") and Frame-4 occurring during a single adaptive TXOP (ATXOP) duration 515. As shown, the EDCA ATXOP duration 515 can be divided into the send time 520 for sending the three frames of the transmission queue (namely, Frame-1, Frame-2 and Frame-3 and respective ACKs) and the send time 525 for sending the predicted next incoming frame (namely, Frame-4 and ACK).

As stated above, the frame size prediction module 264 can apply a Least Mean Square (LMS) prediction algorithm or a wavelet domain prediction algorithm.

Least Mean Square (LMS) Predictor: The k-step ahead LMS linear prediction algorithm involves the estimation of $x(n+k)$ through a linear combination of the current and past values of $x(n)$. A $p^{th}$ order predicator can be expressed as $$\hat{x}(n+k) = \sum_{l=0}^{p-1} w_n(l)x(n-l) = w_n^T X(n), \qquad (1)$$

where $W_n$ is the prediction coefficient vector which is time varying and updated by minimizing the mean square error $\xi$, where $$\xi = E[e^2(n)]. \qquad (2)$$

$X(n)$, $W_n$ and $e(n)$ are defined in (3)-(6), where $\mu$ is the step size $$X(n)=[x(n), x(n-1), \ldots, x(n-p+1)]^T \qquad (3)$$

$$W_n=[w_n(0), w_n(1), \ldots, w_n(p-1)]^T \qquad (4)$$

$$W_{n+1}=W_n+\mu e(n)X(n) \qquad (5)$$

$$e(n)=x(n+k)-\hat{x}(n+k) \qquad (6)$$

The normalized LMS (NLMS) is a modification of LMS where $W_{n+1}$ is updated as $$w_{n+1} = w_n + \frac{\mu e(n) X(n)}{\|X(n)\|^2} \qquad (7)$$

where $\|X(n)\|^2=X(n)^T X(n)$. Since at time n, the value of $x(n+k)$ is not available to compute $e(n)$, $e(n-k)$ is used instead of equation (7).

Wavelet Domain NLMS Predictor: A wavelet transform can be used for traffic analysis. A wavelet transform when combined with adaptive prediction shows advantages over its time-domain counterparts. Fundamentally, this may be due to the fact that the analyzing wavelet family itself possesses a scale invariant feature, a property not shared by other analysis methods.

An à trous wavelet transform may be used to decompose the video frames. The à trous Haar transform exploits redundant information by eliminating the down sampling effect to generate intact approximations and details. Using the à trous wavelet transform, the scaling coefficients at scale j can be obtained as $$C_0(t) = x(t), \quad (8)$$

$$C_j(t) = \sum_{l=-\infty}^{\infty} h(l) C_{j-1}(t - 2^{j-1}l), \quad (9)$$

where $1 \leq j \leq J$ and h is a low pass filter with compact support. The wavelet coefficients at scale j can be obtained by taking the difference of the successive smoothed version of the signal as $$D_j(t) = C_{j-1}(t) - C_j(t). \quad (10)$$

The vector $[D_1, D_2, \ldots, D_j, C_j]$ represents the à trous wavelet transform of the signal up to resolution level J. The signal can be reconstructed as a linear combination of the wavelet and scaling coefficients $$x(t) = C_j(t) + \sum_{j=1}^{J} D_j(t). \quad (11)$$

Many wavelet filters are available, such as Daubechies' family of wavelet filters, B3 spline filter, etc. Here we choose the Haar wavelet filter to implement the à trous wavelet transform. A major reason for choosing the Haar wavelet filter is that at any time instant t, the information after t never needs to be used to calculate the scaling and wavelet coefficients, which is a desirable feature in the time-series forecast. The Haar wavelet uses a simple filter h=(½; ½). The scaling coefficients at the higher scale can be easily obtained from the scaling coefficients at the lower scale.

In one embodiment, the wavelet-domain NLMS prediction scheme first separates the video frame into I, P and B subgroups and decomposes each subgroup into different scales using à trous Haar wavelet transform. Then, the wavelet coefficients and the scaling coefficients are predicted independently at each scale. Finally, the predicted values of the original frames can be construed as a sum of the predicted wavelet and scaling coefficients. The prediction of coefficients can be expressed as $$\hat{C}_j(t+p) = NLMS(C_j(t), C_j(t-1), \ldots C_j(t-1), \ldots C_j(t-\text{order}+1)) \quad (12)$$

$$\hat{D}_j(t+p) = NLMS(D_j(t), D_j(t-1), \ldots D_j(t-\text{order}+1)) \quad (13)$$

where NLMS represents the NLMS predictor and order is the length of the NLMS predictor. FIG. 6 shows an example architecture of wavelet decomposition and coefficients prediction mechanism 600 in accordance with an embodiment of the present invention.

One skilled in the art may find that using wavelet-domain NLMS prediction as compared to its time-domain counterpart has advantages. For example, NLMS prediction, when combined with a wavelet transform, allows the exploitation of the correlation structure at different time scales, which may not be easily examined in the time domain. Also, using a wavelet transform helps the NLMS to converge faster that its time domain counterpart. As a result, the wavelet-domain NLMS prediction algorithm may achieve better accuracy with a small computation complexity.

Figure 7:
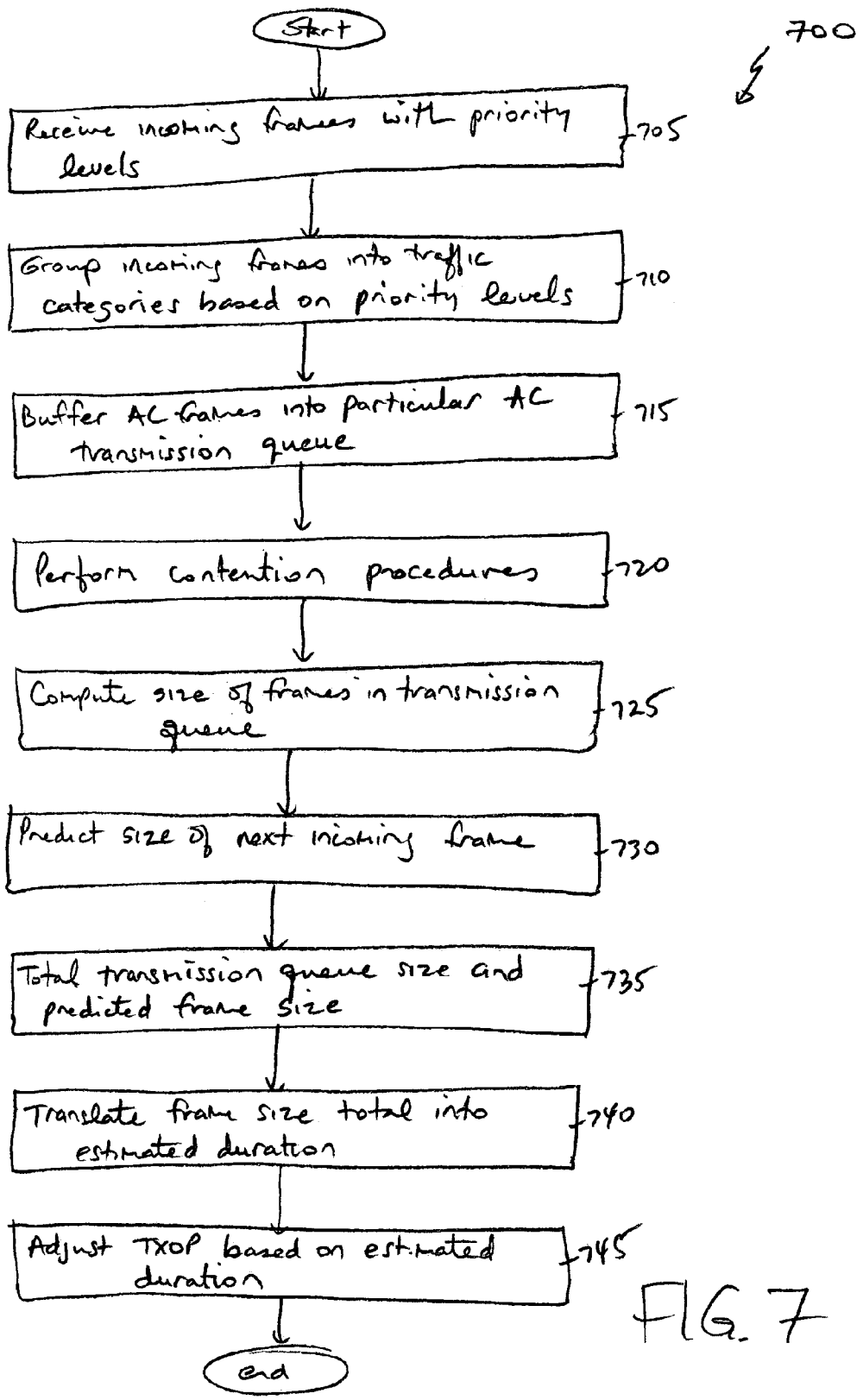
FIG. 7 is a flowchart illustrating an adaptive EDCA method using traffic prediction, in accordance with an embodiment of the present invention.

FIG. 7 is a flowchart illustrating an adaptive EDCA method 700 using traffic prediction, in accordance with an embodiment of the present invention. Method 700 begins in step 705 with the MAC layer receiving incoming frames with priority levels. The MAC layer in step 710 groups the incoming frames into traffic categories based on the priority levels. The AC transmit queue 208, e.g., the video AC transmit queue 258, in step 715 buffers the AC frames 206, e.g., the video frames 256. The contention module 210, e.g., the contention module 260, in step 720 performs contention procedures to contend for access to the wireless medium. The queue length module 212, e.g., the queue length module 262, in step 725 computes the size of the frames in the transmission queue 208. The future frame size prediction module 214, e.g., the future video frame size prediction module 264, in step 730 predicts the size of the next incoming frame. Step 730 may include using a known pattern 216 of incoming frames, e.g., a GoP pattern of MPEG-1 frames, to predict the next frame type. Step 730 may also include performing size prediction based on the frame type, e.g., using I frame size prediction module 266, P frame size prediction module 268 and B frame size prediction module 270. A summation block 218, e.g., summation block 274, in step 735 totals the transmission queue size and the predicted future frame size. An EDCA TXOP estimation module 220, e.g., EDCA TXOP estimation module 276, in step 740 translates the total frame size into an estimated duration. Step 740 may include using a translation coefficient based on average, current, negotiated, set, etc. transmission speeds of the wireless medium. Step 740 may also include adding a little extra time to the estimated duration in case the frame size prediction is slightly low. The TXOP adjustment module 222, e.g., the TXOP adjustment module 278, in step 745 adjusts the TXOP value in the MAC layer based on the estimated duration. Method 700 then ends.

Although the above systems and methods have been described for adaptive TXOP duration, one skilled in the art will recognize that other EDCA parameters may alternatively and/or additionally be adapted. Although the above systems and methods have been described as predicting a single future frame, one skilled in the art will recognize that other embodiments may modify TXOP and/or other EDCA parameters based on predicting one or more future frame sizes.

Figure 8:
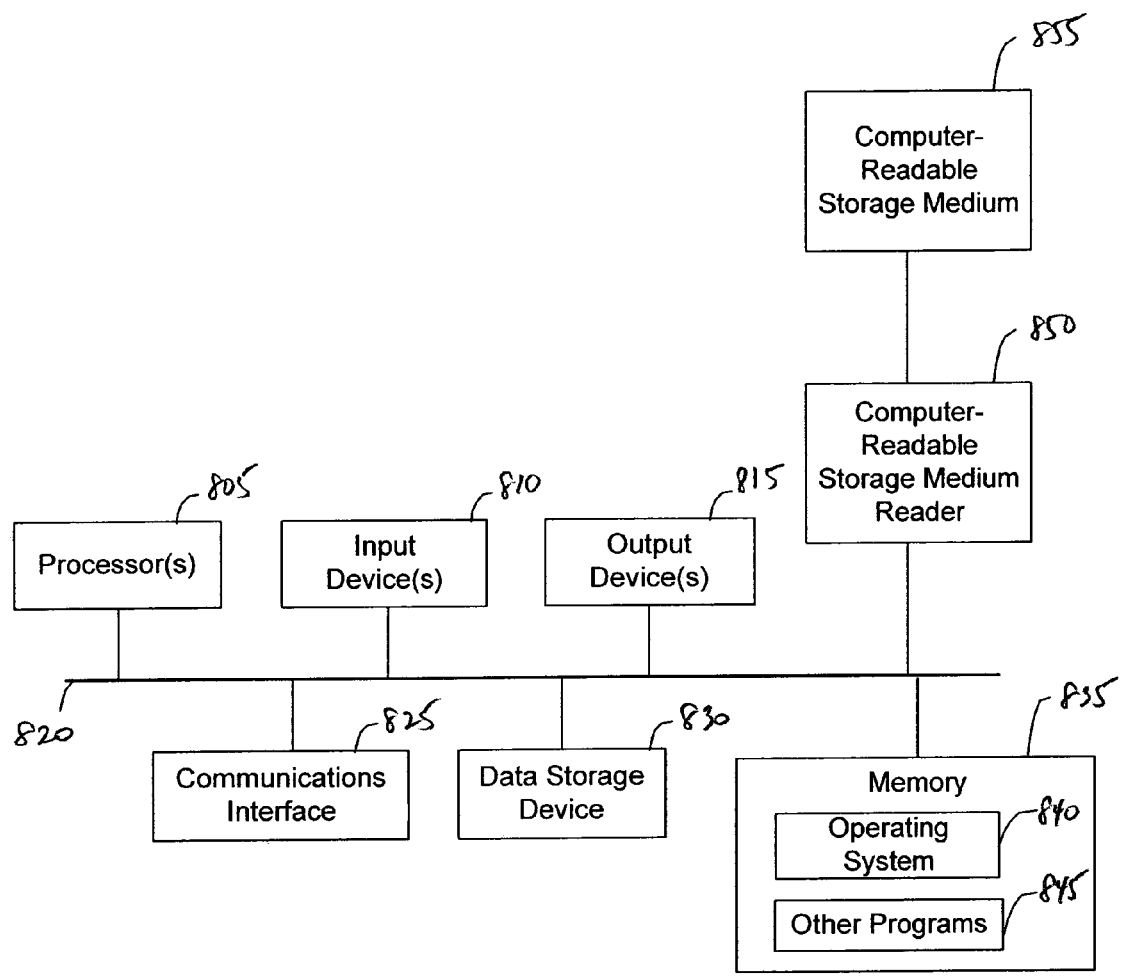
FIG. 8 is a block diagram of a computer system.

FIG. 8 is a block diagram illustrating details of an example computer system 800, of which each station may be an instance. Computer system 800 includes a processor 805, such as an Intel Pentium® microprocessor or a Motorola Power PC® microprocessor, coupled to a communications channel 820. The computer system 800 further includes an input device 810 such as a keyboard or mouse, an output device 815 such as a cathode ray tube display, a communications device 825, a data storage device 830 such as a magnetic disk, and memory 835 such as Random-Access Memory (RAM), each coupled to the communications channel 820. The communications interface 825 may be coupled to a network such as the wide-area network commonly referred to as the Internet. One skilled in the art will recognize that, although the data storage device 830 and memory 835 are illustrated as different units, the data storage device 830 and memory 835 can be parts of the same unit, distributed units, virtual memory, etc.

The data storage device 830 and/or memory 835 may store an operating system 840 such as the Microsoft Windows NT or Windows/95 Operating System (OS), the IBM OS/2 operating system, the MAC OS, or UNIX operating system and/or other programs 845. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 800 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 850 such as a magnetic disk drive, hard disk drive, magneto-optical reader, CPU, etc. may be coupled to the communications bus 820 for reading a computer-readable storage medium (CRSM) 855 such as a magnetic disk, a hard disk, a magneto-optical disk, RAM, etc. Accordingly, the computer system 800 may receive programs and/or data via the CRSM reader 850. Further, it will be appreciated that the term "memory" herein is intended to cover all data storage media whether permanent or temporary.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A method comprising:
   buffering at least one frame for a particular access class in a transmission queue;
   performing contention-based procedures for access to a wireless medium;
   computing the size of the at least one frame in the transmission queue;
   predicting the size of at least one future frame expected to arrive in the transmission queue during transmission of the at least one frame in the transmission queue on the wireless medium; and
   adjusting a MAC layer time value based on the size of the at least one frame in the transmission queue and the predicted size of the at least one future frame.

2. The method of claim 1, wherein the access class includes video access class.

3. The method of claim 2, wherein the predicting the size of the at least one future frame includes using a known pattern of incoming frames and estimating the size of the at least one future frame based on the pattern.

4. The method of claim 3, wherein the predicting the size of the at least one future frame includes using a time-domain prediction algorithm.

5. The method of claim 3, wherein the predicting the size of the at least one future frame includes using a wavelet-domain prediction algorithm.

6. The method of claim 3, wherein the predicting the size of the at least one future frame includes predicting the size of frames based on frame type.

7. The method of claim 6, wherein the frame types include MPEG frame types.

8. The method of claim 1, wherein the MAC layer time value includes TXOP.

9. The method of claim 1, further comprising summing the size of the at least one frame in the transmission queue and the size of the at least one future frame to generate a total, and translating the total into an estimated transmission time.

10. The method of claim 9, further comprising accounting for transmission overhead time.

11. A system comprising:
   a transmission queue for buffering at least one frame for a particular access class;
   a contention module for performing contention-based procedures for access to a wireless medium;
   a queue length module for computing the size of the at least one frame in the transmission queue;
   a future frame size prediction module for predicting the size of at least one future frame expected to arrive in the transmission queue during transmission of the at least one frame in the transmission queue on the wireless medium; and
   an adjustment module for adjusting a MAC layer duration value based on the size of the at least one frame in the transmission queue and the predicted size of the at least one future frame.

12. The system of claim 11, wherein the access class includes video access class.

13. The system of claim 12, wherein the future frame size prediction module uses a known pattern of incoming frames and estimates the size of the at least one future frame based on the pattern.

14. The system of claim 13, wherein the future frame size prediction module uses a time-domain prediction algorithm.

15. The system of claim 13, wherein the future frame size prediction module uses a wavelet-domain prediction algorithm.

16. The system of claim 13, wherein the future frame size prediction module predicts the size of frames based on frame type.

17. The system of claim 16, wherein the frame types include MPEG frame types.

18. The system of claim 11, wherein the MAC layer time value includes TXOP.

19. The system of claim 11, further comprising a summation module for summing the size of the at least one frame in the transmission queue and the size of the at least one future frame to generate a total, and an estimation module for translating the total into an estimated transmission time.

20. The system of claim 19, wherein the estimation module accounts for transmission overhead time.

21. A system comprising:
   means for buffering at least one frame for a particular access class in a transmission queue;

means for performing contention-based procedures for access to a wireless medium;

means for computing the size of the at least one frame in the transmission queue;

means for predicting the size of at least one future frame expected to arrive in the transmission queue during transmission of the at least one frame in the transmission queue on the wireless medium; and means for adjusting a MAC layer time value based on the size of the at least one frame in the transmission queue and the predicted size of the at least one future frame.

\* \* \* \* \*